United States Patent
Yusa et al.

(10) Patent No.: US 11,648,718 B2
(45) Date of Patent: May 16, 2023

(54) RESIN MOLDED ARTICLE UNIT AND METHOD FOR MOLDING RESIN MOLDED ARTICLE UNIT

(71) Applicant: HONDA MOTOR CO., LTD., Tokyo (JP)

(72) Inventors: Atsushi Yusa, Tochigi (JP); Yusuke Takamura, Tochigi (JP); Kenichi Chujo, Tochigi (JP); Hajime Miyamoto, Tochigi (JP); Toshio Kazami, Tochigi (JP); Satoru Iriyama, Tochigi (JP); Masahiko Nakayama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 16/759,929

(22) PCT Filed: Oct. 24, 2018

(86) PCT No.: PCT/JP2018/039453
§ 371 (c)(1),
(2) Date: Apr. 28, 2020

(87) PCT Pub. No.: WO2019/087889
PCT Pub. Date: May 9, 2019

(65) Prior Publication Data
US 2021/0178645 A1 Jun. 17, 2021

(30) Foreign Application Priority Data
Nov. 6, 2017 (JP) .............................. JP2017-214013

(51) Int. Cl.
*B60R 13/02* (2006.01)
*B29C 45/14* (2006.01)
(Continued)

(52) U.S. Cl.
CPC .. *B29C 45/14336* (2013.01); *B29C 45/14065* (2013.01); *B60K 37/00* (2013.01); *B60R 13/0256* (2013.01); *B29L 2031/3008* (2013.01)

(58) Field of Classification Search
CPC ................ B60K 37/00; B60R 13/0256; B29L 2031/3008; B29L 2031/3041
See application file for complete search history.

(56) References Cited

U.S. PATENT DOCUMENTS 5,618,485 A * 4/1997 Gajewski ............ B60R 21/2165
264/328.8
7,108,825 B2 * 9/2006 Dry ..................... B29C 45/2628
264/328.8
(Continued)

FOREIGN PATENT DOCUMENTS

JP 63-312249 12/1988
JP H06-23849 2/1994
(Continued)

OTHER PUBLICATIONS

Judome et al., Method for Fixing End of Skin Material, Jun. 20, 2000, EPO, JP 2000-167935 A, Machine Translation of Description (Year: 2000).*
(Continued)

*Primary Examiner* — James A English
(74) *Attorney, Agent, or Firm* — Rankin, Hill & Clark LLP

(57) ABSTRACT

An instrument panel unit (2) includes an instrument panel (3) and a decorative sheet (4). The instrument panel (3) includes a sticking portion (3a) and an exposed portion (3b). A plurality of insertion grooves (3c) and insertion holes (3d), into which bent pieces (4a) formed at rear end of the decorative sheet (4) are inserted, are formed alternately on a rear side end of the sticking portion (3a). A groove front-surface (3g) forming the insertion groove (3c) of the
(Continued)

instrument panel (3) is formed in a tapered shape such that a width between the groove front-surface and an opposing groove rear-surface (3h) gradually increases upward. The bent piece (4a) of the decorative sheet (4) is thinner than a groove width at an upper part serving as an entrance part of the insertion groove (3c) and thicker than the groove width of a groove bottom-surface (3i) in the insertion groove (3c).

6 Claims, 9 Drawing Sheets

(51) Int. Cl.
    *B60K 37/00*      (2006.01)
    *B29L 31/30*      (2006.01)

(56) References Cited

U.S. PATENT DOCUMENTS

| | | | | |
|---|---|---|---|---|
| 2001/0012812 A1* | 8/2001 | Spengler | ................ | B60R 13/01 493/100 |
| 2006/0026574 A1* | 2/2006 | Lesot | ................ | G06F 9/30174 717/146 |
| 2008/0185863 A1* | 8/2008 | Kamano | ................ | B60K 37/00 296/70 |
| 2020/0346594 A1* | 11/2020 | Yusa | ................ | B60K 35/00 |

FOREIGN PATENT DOCUMENTS

| | | | | |
|---|---|---|---|---|
| JP | H06-72256 | | 3/1994 | |
| JP | 10315241 A | * | 12/1998 | ......... B29C 45/1671 |
| JP | 2000117773 A | * | 4/2000 | ......... B29C 45/1671 |
| JP | 2000-167935 | | 6/2000 | |
| JP | 2001-328173 | | 11/2001 | |
| JP | 2003220854 A | * | 8/2003 | ......... B29C 44/1257 |
| JP | 2013163269 A | * | 8/2013 | |

OTHER PUBLICATIONS

International Search Report, dated Nov. 27, 2018, 1 pages.
Chinese Office Action dated Jun. 9, 2021, English translation included, 17 pages.

\* cited by examiner

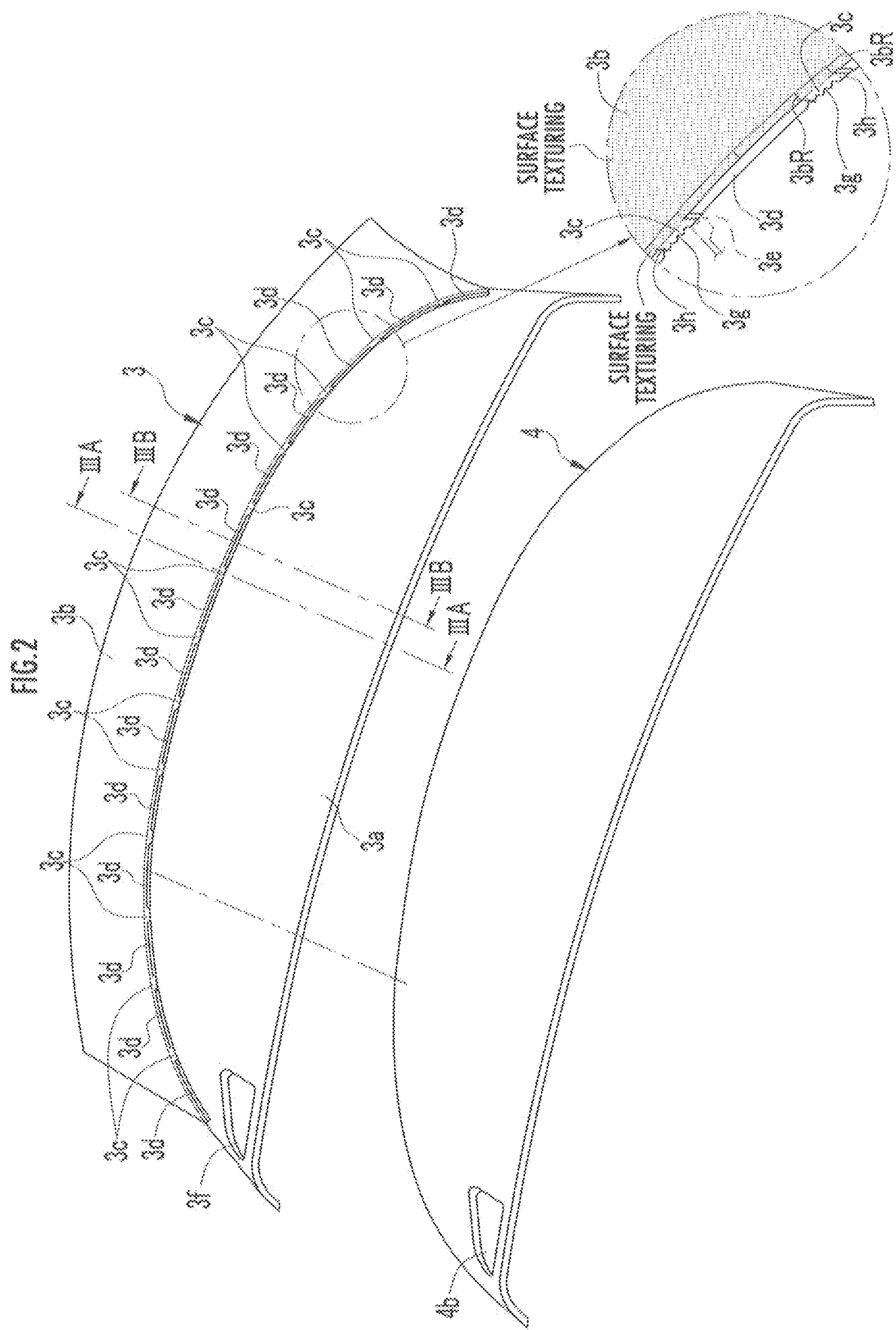

DIE CLAMPING/DIE OPENING DIRECTION

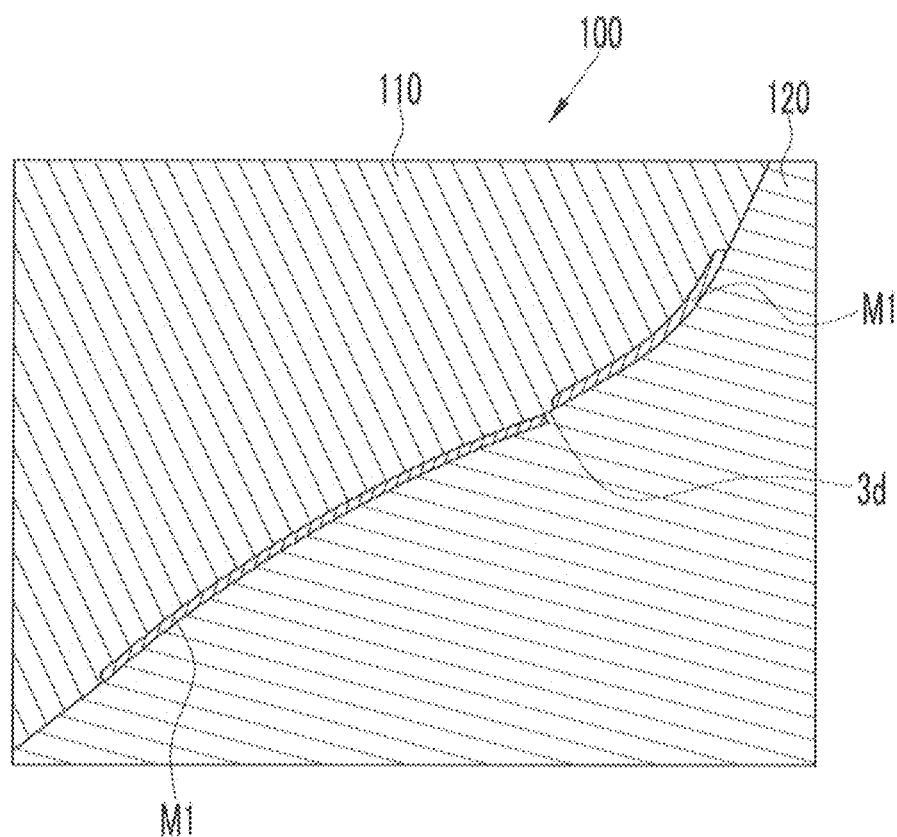

RESIN MOLDED ARTICLE UNIT AND METHOD FOR MOLDING RESIN MOLDED ARTICLE UNIT

TECHNICAL FIELD

The present invention relates to a resin molded-product unit and a molding method of the resin molded-product unit.

BACKGROUND ART

Since instrument panels provided in vehicles can be visually recognized from occupants, they are required to have high design properties. Accordingly, a resin instrument panel is provided with a groove, into which an edge of a sheet having design properties is fitted, and the sheet is stuck to the instrument panel (for example, Patent Literature 1).

In Patent Literature 1, it is difficult to insert a side edge of the sheet into the groove of the instrument panel. In Patent Literature 2, therefore, an edge of a sheet is inserted into a groove in a state where a groove width is widened by deformation of a portion of an instrument panel in which the groove is formed, and thus work of attaching the sheet to the instrument panel is facilitated.

CITATION LIST

Patent Literature

Patent Literature 1: Japanese Patent Laid-Open No. H06-023849
Patent Literature 2: Japanese Patent Laid-Open No. 2000-167935

SUMMARY OF INVENTION

Technical Problem

In Patent Literature 2, a step of widening the groove width by deformation of a portion of an instrument panel in which the groove is formed is required, and the number of steps increases.

The present invention has been made in view of such circumstances, and the object of the present invention is to provide a resin molded-product unit in which a bent piece can easily be inserted into insertion groove and a molding method of the resin molded-product unit.

Solution to Problem

A resin molded-product unit according to the present invention is a resin molded-product unit comprising: an attachment member including a bent piece formed at one end; and a resin molded-product including an insertion groove which is formed on a surface and into which the bent piece is inserted, the attachment member being attached to the surface. The insertion groove is formed such that a groove width between a first side surface abutting on a rear surface of the bent piece and a second side surface opposite to the first side surface becomes wider at an entrance part than a bottom part, and the bent piece is formed to be thinner than the groove width at the entrance part of the insertion groove and to be thicker than the groove width at the bottom part of the insertion groove.

According to the resin molded-product unit of the present invention, since the groove width of the insertion groove is the same at the bottom part and the entrance part, the bent piece can be easily inserted into the insertion groove as compared with a case where the width of the bent piece is equal to or larger than the groove width at the entrance part of the insertion groove.

Preferably, the resin molded-product is formed with an insertion hole that penetrates from the surface to a rear surface and into which the bent piece is inserted, the resin molded-product is molded by a first resin molding die and a second resin molding die that are capable of being separated from each other in a first direction, the insertion hole is molded by insertion hole molding portions that are respectively provided in the first resin molding die and the second resin molding die and abut on each other during molding of the resin molded-product, and the insertion groove is molded by insertion groove molding portion that is movably provided in the first resin molding die configured to mold the surface of the resin molded-product in a second direction inclined with respect to the first direction.

When the insertion groove is molded in the resin molded-product, it is necessary to form a protrusion portion in the resin molding die. In this case, when die opening is performed after the completion of the resin molding, it is necessary to pull out the protrusion portion of the die from the insertion groove of the resin molded-product, and the resin molded-product may be pulled during the pulling. In the resin molded-product, when the pulling range of the protrusion portion is increased, molding defects may occur due to pulling and deformation of the resin molded-product.

According to the configuration described above, as the insertion portion into which the bent piece is inserted, the insertion hole is provided in addition to the insertion groove, and thus the pulling range of the protrusion portion of the die can be reduced as compared with a case where only the insertion groove is provided. Thus, molding defects can be reduced and shape defects of the resin molded-product can be reduced, so that it is possible to provide the resin molded-product unit using the resin molded-product in which the shape defects are reduced.

Preferably, one end surface of the bent piece abuts on a bottom surface of the insertion groove, and a side surface of the bent piece abut on a side surface of the insertion groove.

According to the configuration described above, the bent piece can be positioned by the insertion groove.

Preferably, an uneven portion is formed on the first side surface.

According to the configuration described above, the bent piece inserted into the insertion groove is hardly removed as compared with a case where the first side surface has no unevenness.

A molding method of a resin molded-product unit according to the present invention is a molding method of a resin molded-product unit comprising: an attachment member including a bent piece formed at one end; and a resin molded-product including an insertion groove which is formed on a surface and into which the bent piece is inserted, the attachment member being attached to the surface, the molding method comprising inserting the bent piece into the insertion groove, the insertion groove being formed such that a groove width between a first side surface, which abuts on an inner surface of the bent piece, of side surfaces of the insertion groove and a second side surface opposite to the first side surface, becomes wider at an entrance part than a bottom part of the insertion groove, the bent piece being formed to be thinner than the groove width at the entrance part of the insertion groove and to be thicker than the groove width at the bottom part of the insertion groove.

According to the molding method of the resin molded-product unit of the present invention, since the groove width of the insertion groove is the same at the bottom part and the entrance part, the bent piece can be easily inserted into the insertion groove as compared with a case where the width of the bent piece is equal to or larger than the groove width at the entrance part of the insertion groove.

Preferably, the resin molded-product is formed with an insertion hole that penetrates from the surface to a rear surface and into which the bent piece is inserted, the resin molded-product is molded by a first resin molding die and a second resin molding die that are capable of being separated from each other in a first direction, the insertion hole is molded by an insertion hole molding portion that is respectively provided in the first resin molding die and the second resin molding die and abut on each other during molding of the resin molded-product, and the insertion groove is molded by an insertion groove molding portion that is movably provided in the first resin molding die configured to mold the surface of the resin molded-product in a second direction inclined with respect to the first direction.

According to the configuration described above, as the insertion portion into which the bent piece is inserted, the insertion hole is provided in addition to the insertion groove, and thus the pulling range of the protrusion portion of the die can be reduced as compared with a case where only the insertion groove is provided. Thus, molding defects can be reduced and shape defects of the resin molded-product can be reduced, so that it is possible to provide the resin molded-product unit using the resin molded-product in which the shape defects are reduced.

BRIEF DESCRIPTION OF DRAWINGS

FIG. 2 is a perspective view showing an instrument panel and a decorative sheet.

FIG. 14 is a cross-sectional view schematically showing the injection molding die of the molding apparatus in a state where the resin material is filled, and is a cross-sectional view of a portion where the insertion hole of the instrument panel is molded.

DESCRIPTION OF EMBODIMENTS

An embodiment of the present invention will be described below with reference to the drawings.

Figure 1:
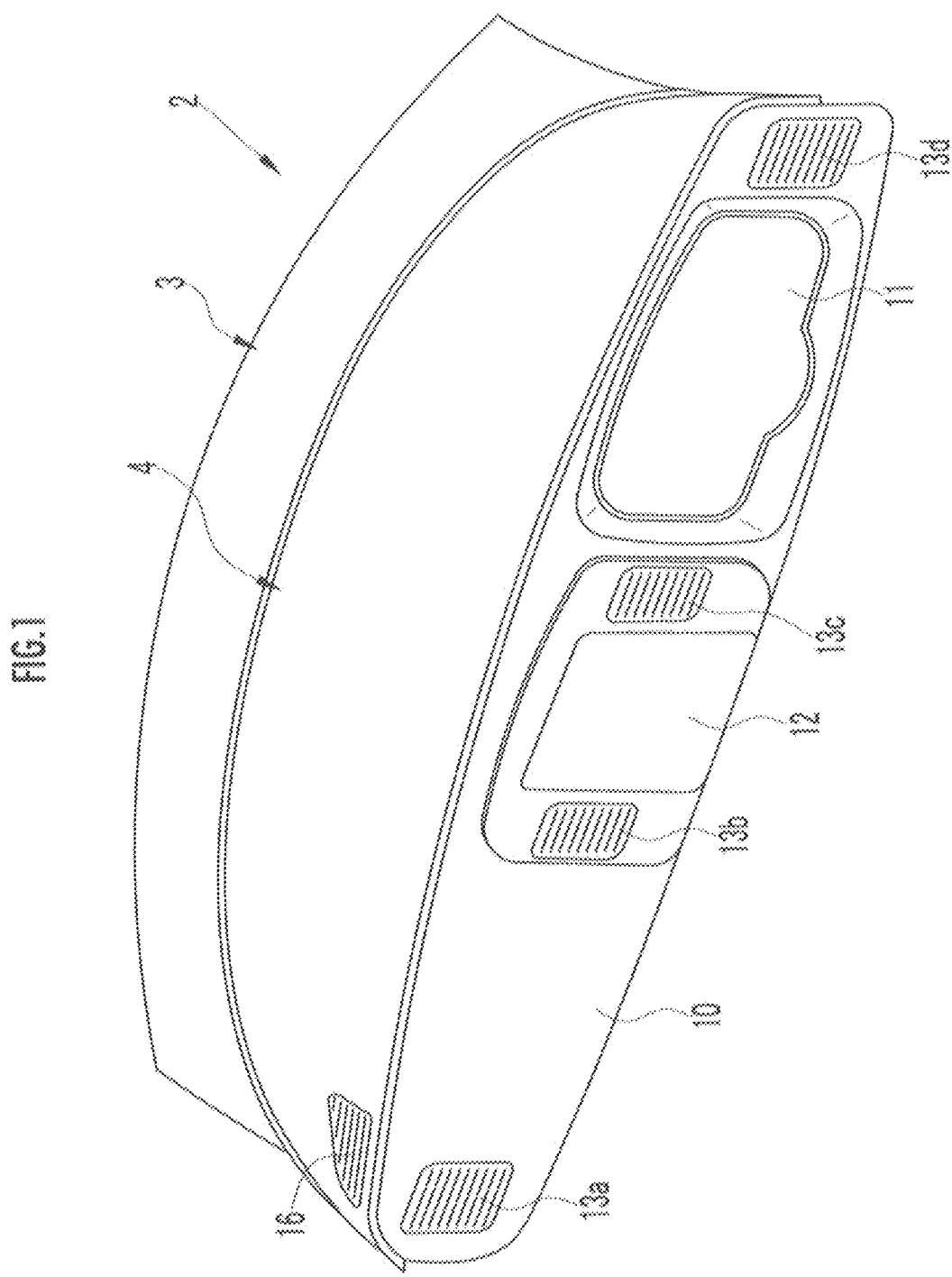
FIG. 1 is a schematic perspective view showing an instrument panel unit according to the present invention.

As shown in FIGS. 1 and 2, an instrument panel unit 2 is used for a vehicle, and comprises an instrument panel 3 (resin molded-product), which is a resin molded-product, and a decorative sheet 4 (attachment member) attached onto a surface of the instrument panel 3. As will be described in detail below, the decorative sheet 4 comprises a sheet-like cover 5 having design properties and a sheet-like foam material 6 (see FIG. 3A).

A front panel 10 is attached to the instrument panel 3. The front panel 10 includes an instrument display 11 on which instruments such as a speedometer, a tachometer, and an odometer are displayed, an electronic device display 12 for electronic devices such as a car navigation device and an audio device, and first to fourth air blowing portions 13a to 13d configured to blow air from an air conditioner (not shown). In addition, a steering (not shown) is attached to a lower part of the instrument display 11 in the front panel 10.

As shown in FIGS. 2.3A, and 3B, the instrument panel 3 comprises a sticking portion 3a having a surface to which the decorative sheet 4 is stuck and an exposed portion 3b provided behind the sticking portion 3a and exposed in a state where occupants of the vehicle can visually recognize.

A plurality of insertion grooves 3c and insertion holes 3d (for example, 13 insertion grooves 3c and 14 insertion holes 3d), into which bent pieces 4a formed at a rear end of the decorative sheet 4 are inserted, are formed at an end on a rear side (on the exposed portion 3b side) of the sticking portion 3a. The insertion grooves 3c and the insertion holes 3d are formed alternately. The insertion grooves 3c and the insertion holes 3d form a fitting portion. In the present embodiment, the insertion grooves 3c and the insertion holes 3d are depicted in an exaggerated way and sizes of the insertion grooves 3c and the insertion holes 3d can be changed as appropriate. Further, the number of the insertion grooves 3c may be one and the number of the insertion holes 3d may be one.

A protrusion portion 3e protruding in a downward direction is formed in a part of the insertion groove 3c, and the insertion groove 3c is formed in the protrusion portion 3e. In addition, an air blowing hole 3f is formed in the sticking portion 3a to blow air. At a front end of the exposed portion 3b, a front end R-shaped portion 3bR having an R shape is formed.

The decorative sheet 4 is configured by bonding of the cover 5 on the foam material 6, and is formed in a shape corresponding to the sticking portion 3a of the instrument panel 3. In the present embodiment, a thickness of the cover 5 is depicted in an exaggerated way.

An air blowing hole 4b is formed in the decorative sheet 4 at a position corresponding to the air blowing hole 3f of the instrument panel 3. The air blowing hole 4b is formed to penetrate through the cover 5 and the foam material 6. An air blowing portion 16 is attached to the air blowing hole 3f and the air blowing hole 4b (see FIG. 1).

Figure 3A:
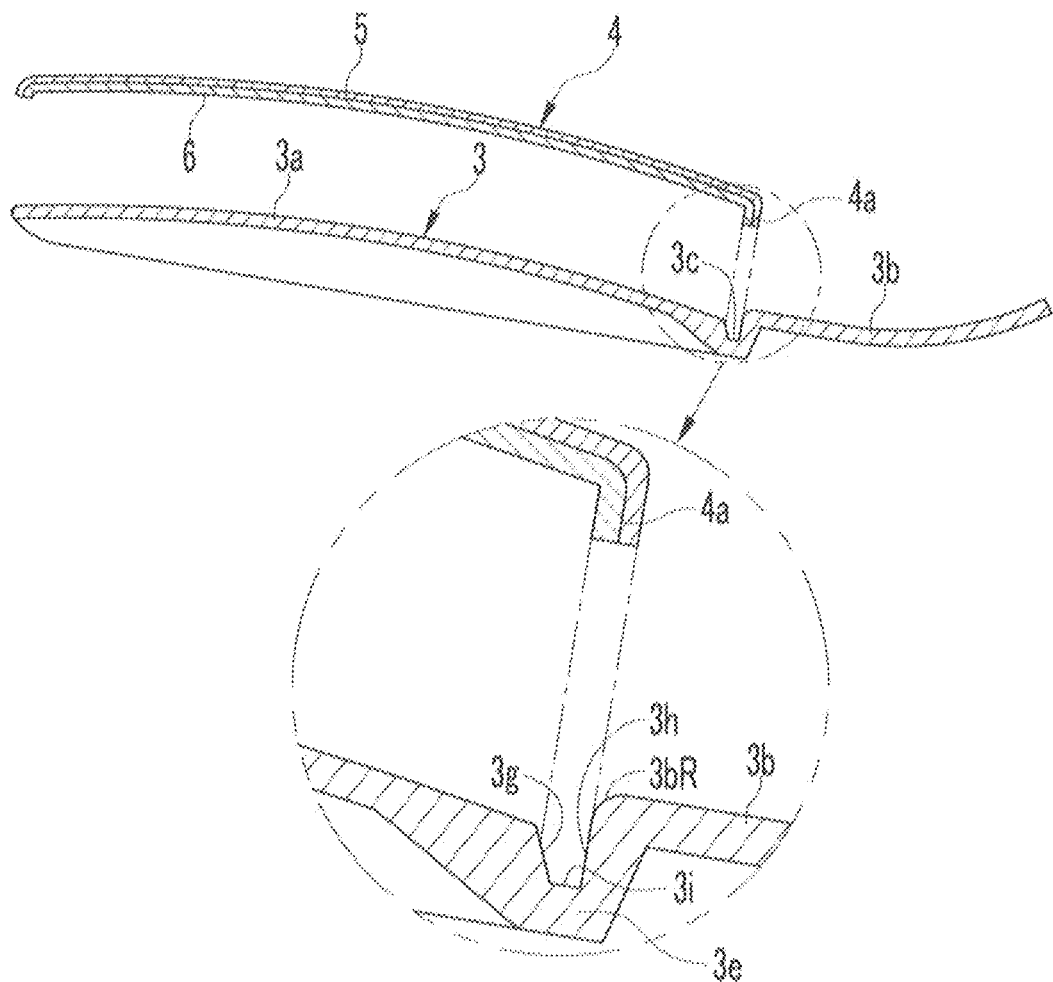
FIG. 3A is a cross-sectional view taken along line IIIA-IIIA.
Figure 3B:
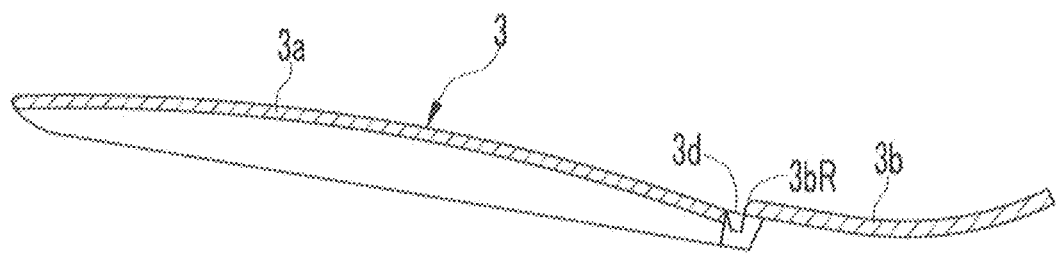
FIG. 3B is a cross-sectional view taken along line IIIB-IIIB.

As shown in FIG. 3A, a groove front-surface 3g (first side surface) forming the insertion groove 3c of the instrument panel 3 is formed in a tapered shape such that a width between the groove front-surface and an opposing groove rear-surface 3h (second side surface) gradually increases in an upward direction. The groove front-surface 3g is formed in an uneven shape. The groove front-surface 3g is not limited to the tapered shape, and may have a shape in which a linear line parallel to the groove rear-surface 3h and an inclined taper line are combined, may have a stepped shape, or may further have a linear shape parallel to the groove rear-surface 3h. In addition, the groove front-surface 3g may have a flat shape without unevenness.

The bent piece 4a of the decorative sheet 4 is formed to be thinner than widths (hereinafter, referred to as groove widths) of the groove front-surface 3g and the groove rear-surface 3h at an upper part serving as an entrance part of the insertion groove 3c and to be thicker than a groove width of a groove bottom-surface 3i in the insertion groove 3c. The width of the bent piece 4a can be changed as appropriate, and may be narrower than the groove width at the upper part serving as the entrance part of the insertion groove 3c or the groove width of the groove bottom-surface 3i.

Next, a description will be given with respect to a unit molding apparatus 50 used to mold the instrument panel unit 2 by sticking the decorative sheet 4 to the sticking portion 3a of the instrument panel 3.

Figure 4:
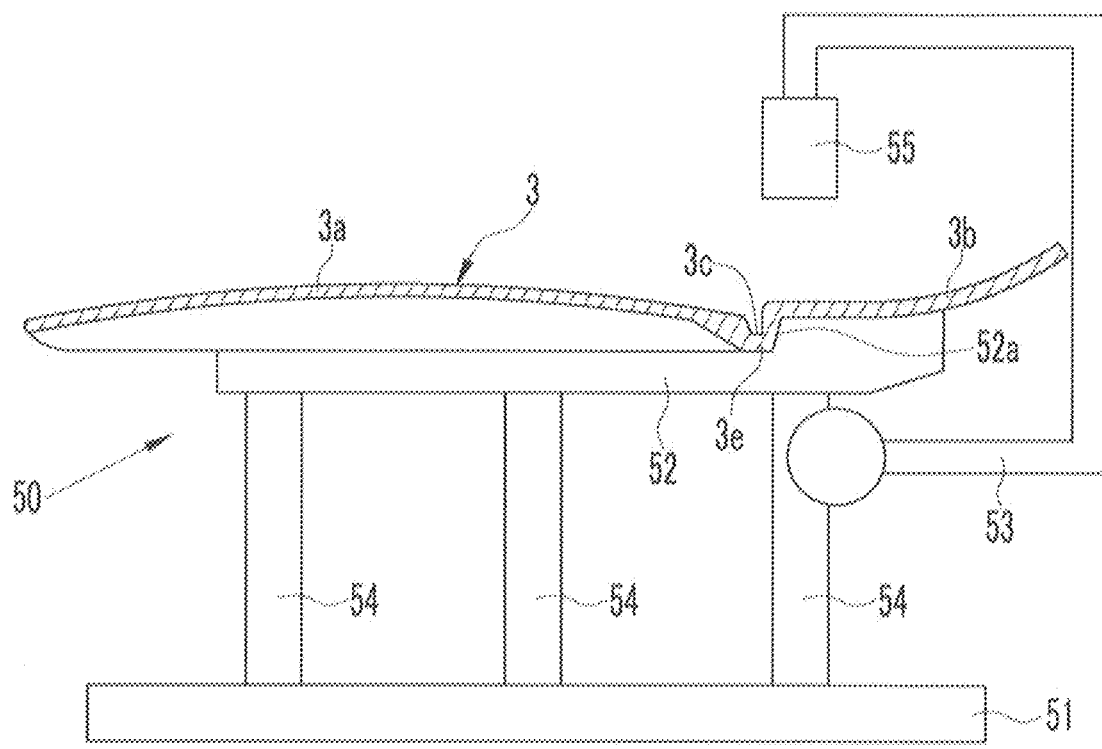
FIG. 4 is a side view showing the instrument panel and a unit molding apparatus.

As shown in FIG. 4, the unit molding apparatus 50 comprises a base 51, a placing table 52 on which the instrument panel 3 is placed, and a moving portion 53. The placing table 52 is fixed to three support pillars 54 provided on the base 51.

The placing table 52 is formed with a positioning portion 52a configured to perform positioning of the instrument panel 3, and the instrument panel 3 is positioned by pushing of the protrusion portion 3e against the positioning portion 52a.

The moving portion 53 is movably provided to the support pillars 54, and includes a pressing portion 55 that pushes downward the exposed portion 3b of the instrument panel 3, which is placed on the placing table 52, against the placing table 52 from above.

A method of molding the instrument panel unit 2 using the unit molding apparatus 50 will be described below.

Before molding of the instrument panel unit 2, an adhesive is applied to the instrument panel 3 by an applicator (not shown). In such an application step, the adhesive is applied to a part of the sticking portion 3a to which the decorative sheet 4 is stuck, and the groove front-surface 3g and the groove bottom-surface 3i of the insertion groove 3c, and the adhesive is not applied to the groove rear-surface 3h of the insertion groove 3c. An example of the adhesive includes an adhesive which is activated when being heated to a predetermined temperature (for example, 100° ° C.) or higher.

The molding method of the instrument panel unit 2 comprises a panel setting step STEP (hereinafter, referred simply to as S) 11, a pressing step S12, a sheet setting step S13, and a sheet inserting step S14, and is performed at room temperature (for example, 27° C.).

First, the panel setting step S11 is performed. In the panel setting step S11, as shown in FIG. 4, an operator places the instrument panel 3 on the placing table 52, and pushes the protrusion portion 3e against the positioning portion 52a, thereby performing positioning of the instrument panel 3.

Figure 5:
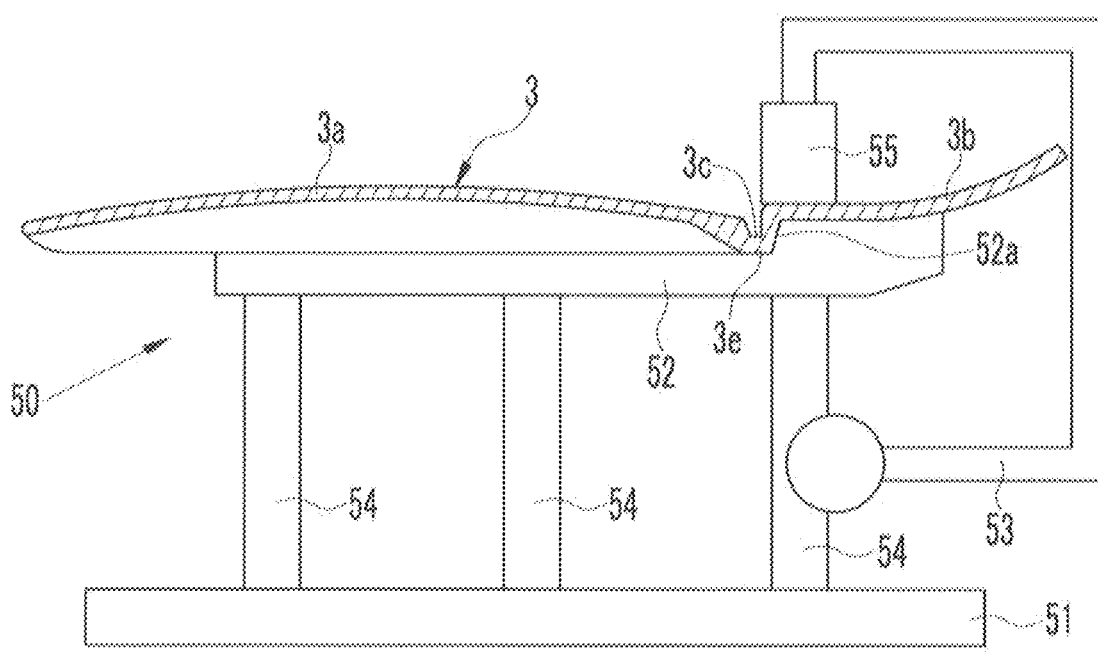
FIG. 5 is a side view showing the instrument panel and the unit molding apparatus in a state where an exposed portion of the instrument panel is pressed against a placing table.

Next, the pressing step S12 is performed. In the pressing step S12, as shown in FIG. 5, the operator moves the moving portion 53 in a downward direction, and presses the exposed portion 3b of the instrument panel 3 against the placing table 52 with the pressing portion 55.

Figure 6:
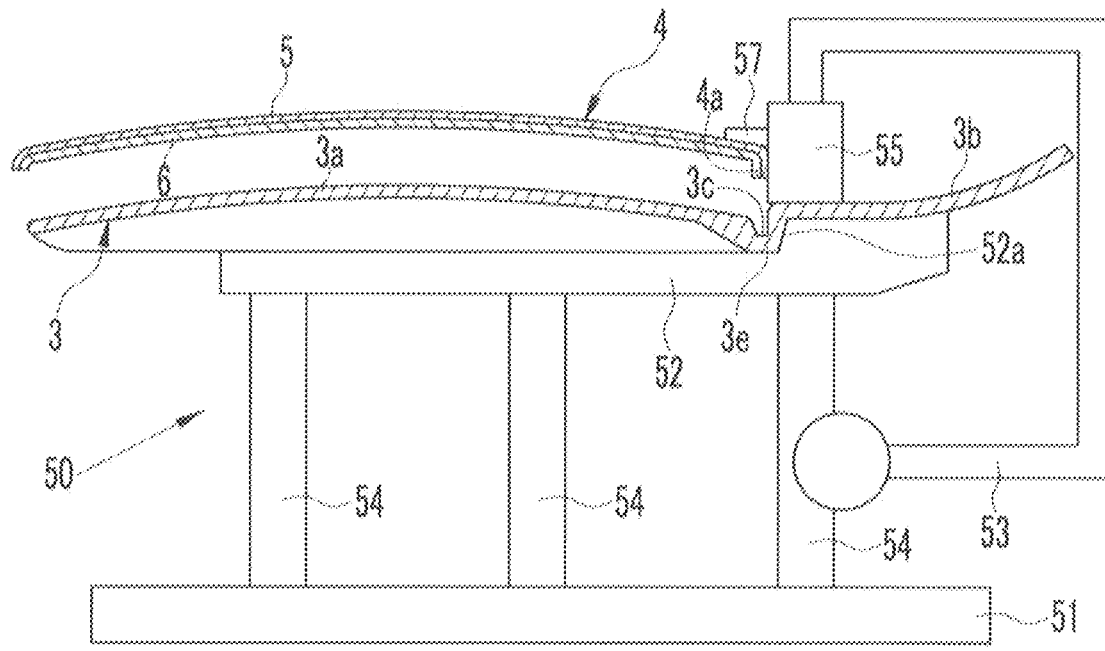
FIG. 6 is a side view showing the instrument panel in which the decorative sheet is set, the decorative sheet, and the unit molding apparatus.

Subsequently, the sheet setting step S13 is performed. In the sheet setting step S13, as shown in FIG. 6, the operator arranges the decorative sheet 4 above the instrument panel 3, and pushes the side surface of the bent piece 4a of the decorative sheet 4 against the side surface of the pressing portion 55.

Figure 7:
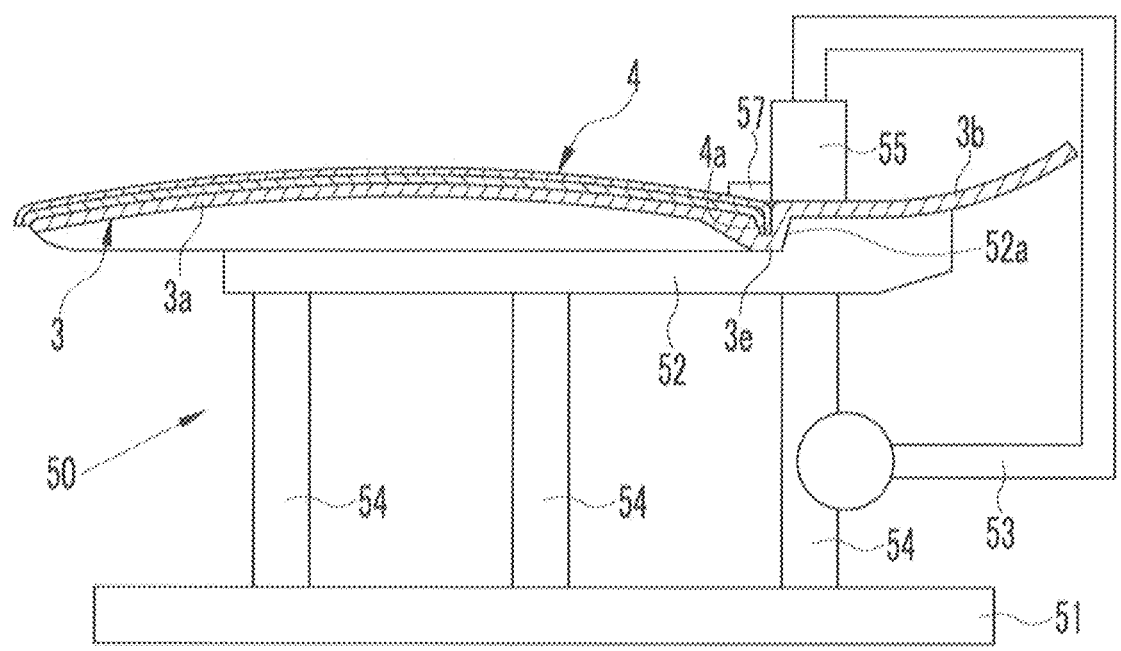
FIG. 7 is a side view showing the instrument panel in a state where a bent piece of the decorative sheet is inserted into an insertion groove of the instrument panel, the decorative sheet, and the unit molding apparatus.

Subsequently, the sheet inserting step S14 is performed. In the sheet inserting step S14, as shown in FIG. 7, the operator moves an insertion assisting plate 57, which is placed on a rear end of the decorative sheet 4, in a downward direction, thereby pushing the rear end of the decorative sheet 4 downwards to insert the bent piece 4a into the insertion groove 3c.

The bent piece 4a of the decorative sheet 4 is formed to be thinner than the groove width at the upper part serving as the entrance part of the insertion groove 3c and to be thicker than the groove width of the groove bottom-surface 3i in the insertion groove 3c. Thus, as shown in FIG. 3A, when the bent piece 4a is inserted into the insertion groove 3c, a lower surface of the bent piece 4a abuts on the groove front-surface 3g of the insertion groove 3c. Therefore, the bent piece 4a can be easily inserted into the insertion groove 3c as compared with a case where the bent piece 4a is thicker than the groove width at the upper part of the insertion groove 3c.

Since the bent piece 4a is thicker than the groove width of the groove bottom-surface 3i of the insertion groove 3c, when the bent piece 4a is inserted into the insertion groove 3c, the bent piece 4a becomes in a press-fit state, and comes in close contact with the groove front-surface 3g and the groove rear-surface 3h of the insertion groove 3c. Note that the bent piece 4a can be inserted into the insertion groove 3c when the foam material 6 of the bent piece 4a is compressed. The cover 5 is pushed against the groove rear-surface 3h due to an elastic force of the foam material 6.

When the bent piece 4a is inserted into the insertion groove 3c, the front lateral surface and the rear lateral surface of the bent piece 4a abut on the groove front-surface 3g and the groove rear-surface 3h of the insertion groove 3c, and the lower surface of the bent piece 4a abuts on the groove bottom-surface 3i of the insertion groove 3c. Thus, the positioning of the bent piece 4a can be performed. The lower surface of the bent piece 4a may fail to abut on the groove bottom-surface 3i.

Further, since the groove front-surface 3g is formed in an uneven shape, the bent piece 4a inserted into the insertion groove 3c is hard to slip compared with a case of being formed in a shape without unevenness, and thus the bent piece 4a can be prevented from coming out of the insertion groove 3c.

Figure 8:
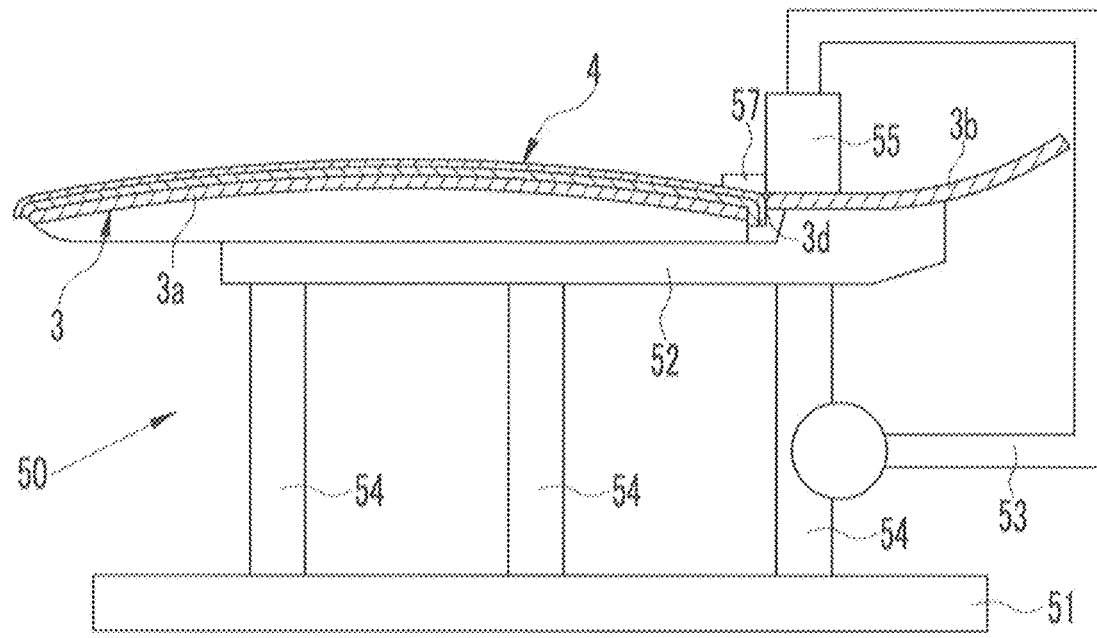
FIG. 8 is a side view showing the instrument panel in a state where the bent piece of the decorative sheet is inserted into an insertion hole of the instrument panel, the decorative sheet, and the unit molding apparatus.

In the sheet inserting step S14, as shown in FIG. 8, the rear end of the decorative sheet 4 is pushed downwards by the insertion assisting plate 57, and the bent piece 4a is inserted into the insertion hole 3d.

The instrument panel unit 2 molded by the respective steps S11 to S14 described above is detached from the unit molding apparatus 50, and is then conveyed to a heating furnace (not shown) in a state of being set in a conveying jig (not shown) capable of holding the instrument panel 3 as in the placing table 52. Then, the instrument panel unit 2 is heated to 100° or higher in the heating furnace.

Since the sheet inserting step S14 is performed at room temperature, the adhesive is in a cured state, and the decorative sheet 4 is in a non-bonding state. Then, when the adhesive is heated to 100° C. or higher in the heating furnace, the adhesive is reactivated. In this state, the decorative sheet 4 is pushed against the instrument panel 3 by a pushing apparatus (not shown). Subsequently, the adhesive is cured by cooling of the instrument panel unit 2, and the decorative sheet 4 is firmly attached to the instrument panel 3.

The member to be stuck to the instrument panel 3 is not limited to the sheet, and can be changed as appropriate.

A description will be given below with respect to an injection molding die 100 as a component of the molding apparatus used at the time of molding of the instrument panel 3.

Figure 9:
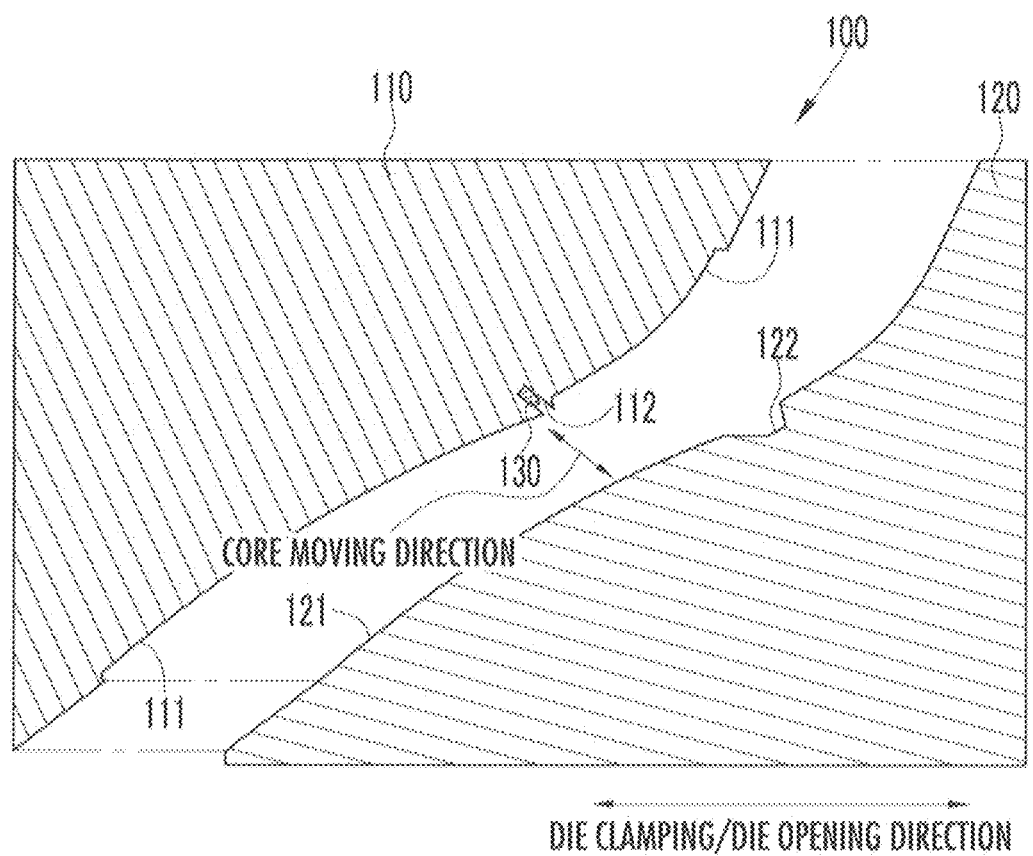
FIG. 9 is a cross-sectional view schematically showing an injection molding die of a molding apparatus in a die opening state, and is a cross-sectional view of a portion where the insertion groove of the instrument panel is molded.
Figure 10:
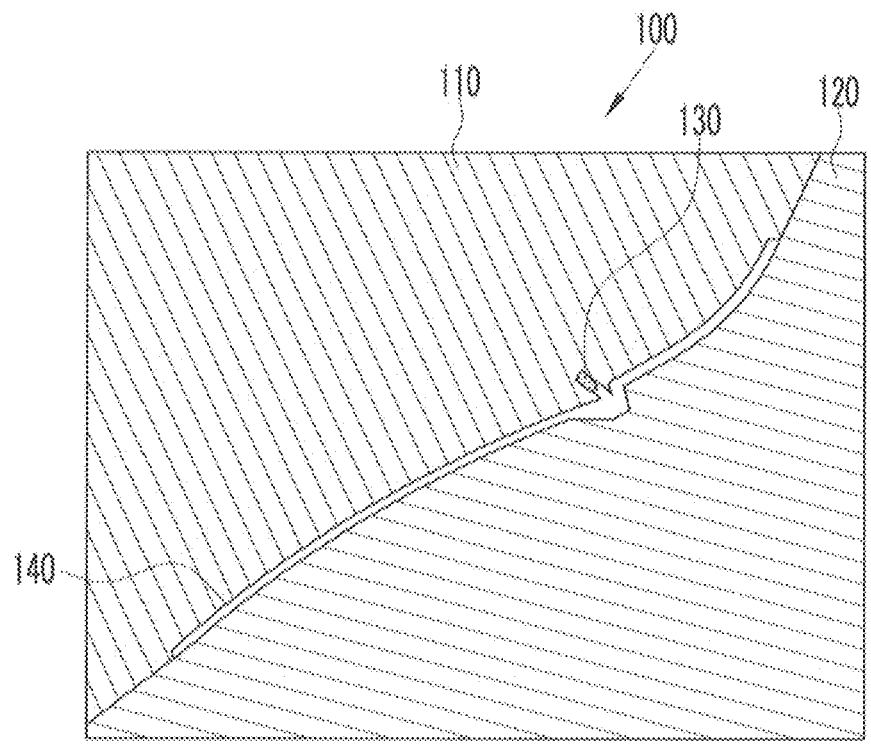
FIG. 10 is a cross-sectional view schematically showing the injection molding die of the molding apparatus in a die clamping state, and is a cross-sectional view of a portion where the insertion groove of the instrument panel is molded.
Figure 11:
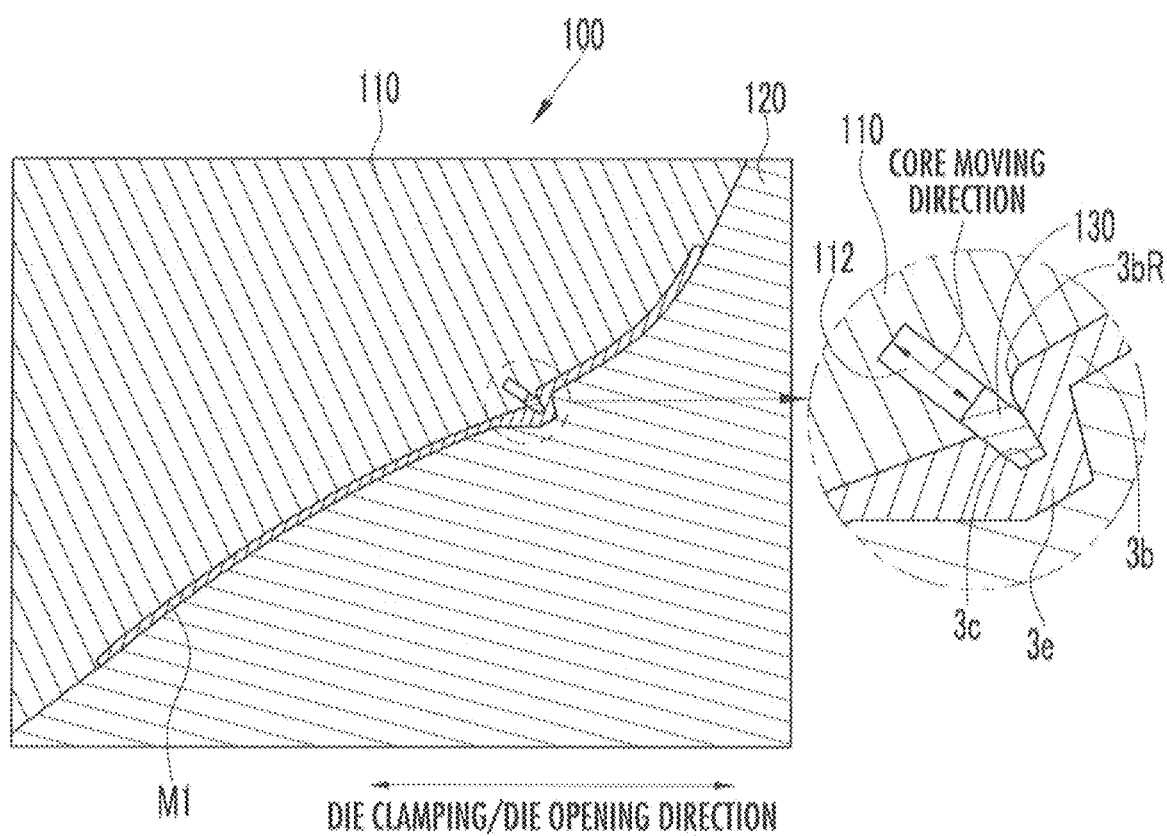
FIG. 11 is a cross-sectional view schematically showing the injection mording die of the molding apparatus in a state where a resin material is filled, and is a cross-sectional view of a portion where the insertion groove of the instrument panel is molded.

As shown in FIGS. 9 to 11, the injection molding die 100 comprises an upper die 110 (first resin molding die), a lower die 120 (second resin molding die), and a core 130 (insertion groove molding portion) used for molding the insertion groove 3c of the instrument panel 3. A plurality of cores 130 (for example, 13 cores) are provided corresponding to the respective insertion grooves 3c. The molding apparatus including the injection molding die 100 is controlled by a controller (not shown).

Die clamping is performed as the lower die 120 relatively approaches the upper die 110, and die opening is performed as the lower die 120 relatively separates from the upper die 110. In the present embodiment, the die clamping is performed as the lower die 120 moves leftward in FIG. 9, and the die opening is performed as the lower die 120 moves rightward in FIG. 9.

The die clamping is performed by the upper die 110 and the lower die 120, thereby forming a cavity 140 in which the instrument panel 3 is molded.

The upper die 110 includes a forming recess portion 111 used for forming the cavity 140 and a supply nozzle (not shown) that injects a resin material M1 used to form the instrument panel 3 into the cavity 140. The forming recess portion 111 includes an accommodating recess portion 112 that movably accommodates the core 130. The core 130 is moved by a core moving portion (not shown) configured by a cylinder, for example.

The accommodating recess portions 112 are respectively provided at parts (13 parts) where the insertion grooves 3c of the instrument panel 3 are molded, and the respective accommodating recess portions 112 accommodate the cores 130. The accommodating recess portion 112 is provided such that the direction of movement of the cores 130 is a direction (second direction) different from a die clamping/die opening direction (first direction) and parallel to the groove front-surface 3g of the insertion groove 3c.

The forming recess portion 111 is subjected to surface texturing (forming unevenness) on the surface of a part where the exposed portion 3b of the instrument panel 3 is molded, and the exposed portion 3b is in a surface-textured state. The design properties of the exposed portion 3b can be improved by such surface texturing.

A part of the forming recess portion 111 where the front end R-shaped portion 3bR of the exposed portion 3b is molded is formed in an R shape for molding of the front end R-shaped portion 3bR having an R shape. The R-shaped part of the forming recess portion 111 is also subjected to surface texturing, and thus the front end R-shaped portion 3bR of the exposed portion 3b is also in a surface-textured state. The front end R-shaped portion 3bR of the exposed portion 3b can be visually recognized from the front when being attached to the vehicle, but can be maintained in design properties because of being subjected to the surface texturing in the R shape.

In addition, the forming recess portion 111 also molds the upper end of the groove rear-surface 3h between the front end R-shaped portion 3bR of the exposed portion 3b and a portion molded by the core 130 of the groove rear-surface 3h of the insertion groove 3c. When the forming recess portion 111 in this portion is also subjected to surface texturing, the upper end of the groove rear-surface 3h can be brought into a surface-textured state.

The core 130 is movably provided between a protruding position (see FIG. 11) protruding from the accommodating recess portion 112 and a retreated position (see FIG. 9) accommodated inside the accommodating recess portion 112.

The lower die 120 includes a forming recess portion 121 configured to form the cavity 140. Parts (13 parts) of the forming recess portion 121 where the protrusion portions 3e are molded include protrusion-portion forming recess portions 122, respectively.

Figure 12:
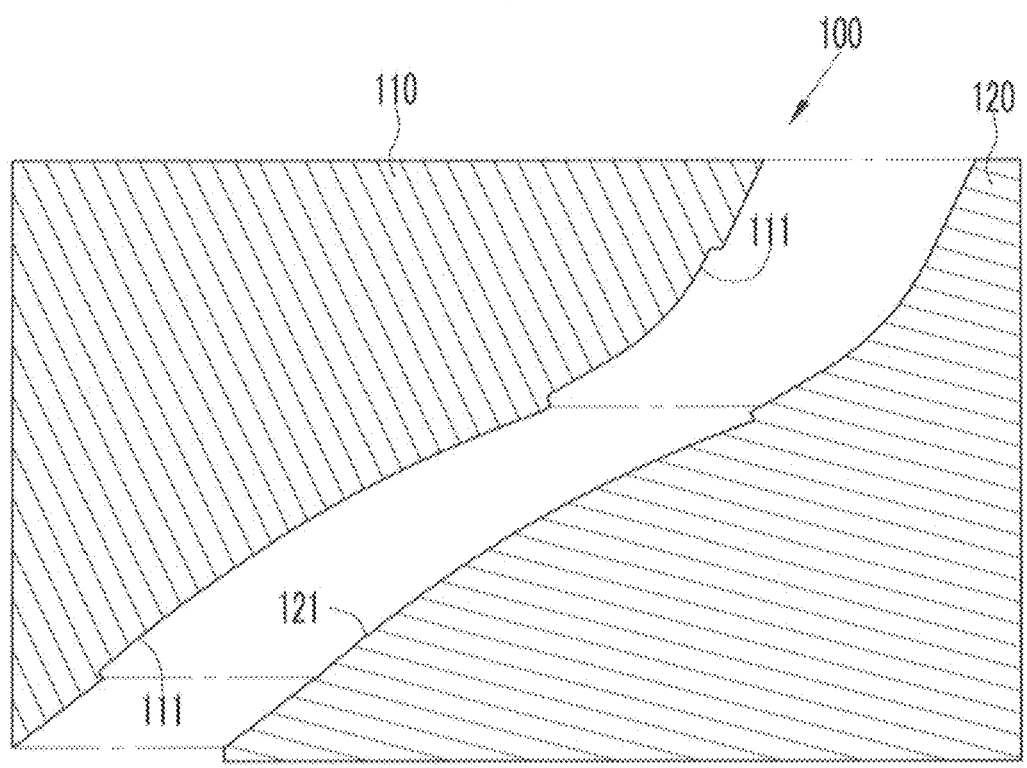
FIG. 12 is a cross-sectional view schematically showing the injection molding die of the molding apparatus in a die opening state, and is a cross-sectional view of a portion where the insertion hole of the instrument panel is molded.
Figure 13:
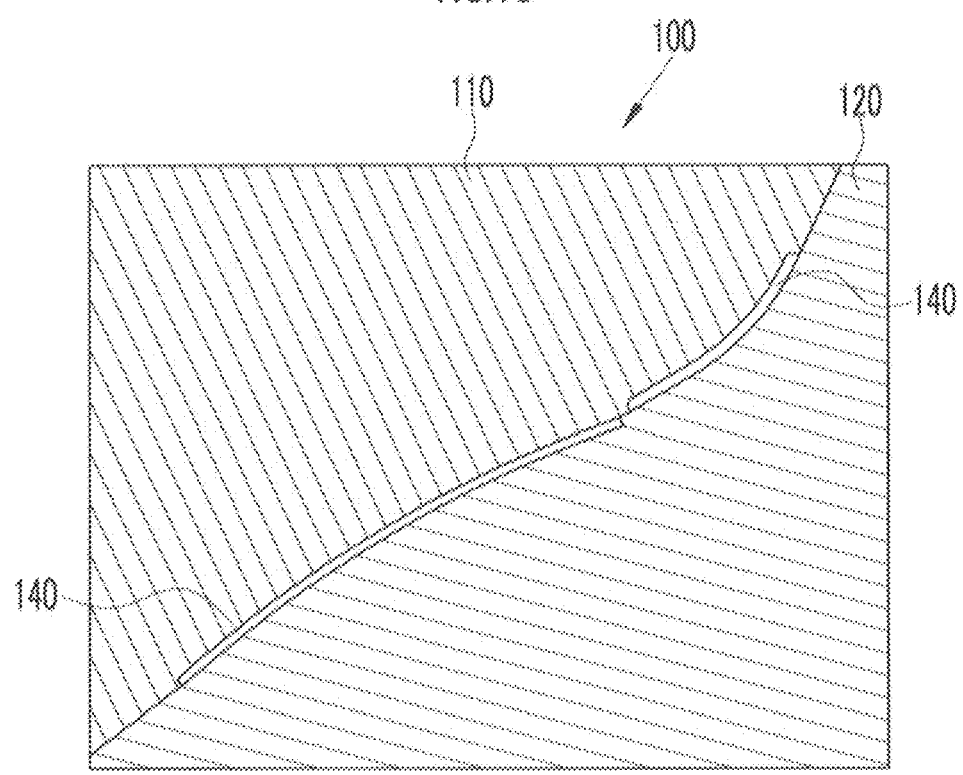
FIG. 13 is a cross-sectional view schematically showing the injection molding die of the molding apparatus in a die clamping state, and is a cross-sectional view of a portion where the insertion hole of the instrument panel is molded.

In parts (14 parts) where the insertion holes 3d are molded, as shown in FIGS. 12 to 14, the accommodating recess portions 112 are not formed in the upper die 110, and the protrusion-portion forming recess portions 122 are not formed in the lower die 120. Thus, when the die clamping is performed, the upper die 110 and the lower die 120 abut on each other, and the insertion holes 3d are molded. The portion where the upper die 110 and the lower die 120 abut on each other is an insertion hole molding portion.

A description will be given below with respect to a method of molding the instrument panel 3 using the molding apparatus including the injection molding die 100.

The molding method of the instrument panel 3 includes a die clamping step S21, a core protruding step S22, a resin filling step S23, a core retreating step S24, and a die opening step S25.

First, the die clamping step S21 is performed. In the die clamping step S21, as shown in FIGS. 10 and 13, the controller performs die clamping by allowing the lower die 120 to advance relatively to the upper die 110, and thus the cavity 140 is formed. At this time, the core 130 is located at the retreated position by the core moving portion.

Subsequently, the core protruding step S22 is performed. In the core protruding step S22, as shown in FIG. 11, the core 130 is moved from the retreated position to the protruding position by the core moving portion.

Subsequently, the resin filling step S23 is performed. In the resin filling step S23, as shown in FIGS. 11 and 14, the resin material M1 is injected from the supply nozzle by the controller and is filled in the cavity 140.

When the resin material M1 is filled in the cavity 140, the insertion groove 3c is molded by the core 130 located at the protruding position. In addition, a part of the upper die 110 and a part of the lower die 120 abut on each other, and thus the insertion hole 3d is molded.

After the resin material filled in the cavity 140 in the resin filling step S23 is solidified, the core retreating step S24 is performed. In the core retreating step S24, the core 130 is moved from the protruding position to the retreated position by the core moving portion.

Subsequently, the die opening step S25 is performed. In the die opening step S25, the controller performs die opening by allowing the lower die 120 to retreat relatively to the upper die 110. Then, the instrument panel 3 is detached from the injection molding die 100. Thereby, the instrument panel 3 is molded.

Since the present embodiment has the die structure in which the fitting portion fitted with the bent piece 4a of the decorative sheet 4 is configured by the insertion grooves 3c and the insertion holes 3d, the core 130 can be made smaller as compared with a case where the fitting portion is configured only by the insertion grooves 3c. Thus, as compared with a case where the core is large, molding defects can be reduced and shape defects of the resin molded-product can be reduced.

REFERENCE SIGNS LIST

2 . . . instrument panel unit, 3 . . . instrument panel (resin molded-product), 4 . . . decorative sheet (attachment member). 4a . . . bent piece, 5 . . . cover, 6 . . . foam material, 3a . . . sticking portion, 3b . . . exposed portion. 3bR front end R-shaped portion. 3c insertion groove, 3d insertion hole, 3g . . . groove front-surface (first side surface), 3h . . . groove rear-surface (second side surface), 3i . . . groove bottom-surface, 50 . . . unit molding apparatus, 100 injection molding die. 110 . . . upper die (first resin molding die), 120 . . . lower die (second resin molding die), 130 . . . core (insertion groove molding portion)

The invention claimed is:

1. A resin molded-product unit comprising:
an attachment member formed of a cover and a foam material, and including a bent piece formed at one end; and
a resin molded-product including an insertion groove which is formed on a surface and into which the bent piece is inserted, the attachment member being attached to the surface, wherein
the insertion groove, as manufactured, is formed such that a first side surface of the insertion groove is inclined relative to a second side surface of the insertion groove opposite to the first side surface, so that a groove width between the first side surface abutting on a rear surface of the bent piece and the second side surface opposite to the first side surface becomes wider at an entrance part than a bottom part,
the bent piece is formed to be thinner than the groove width at the entrance part of the insertion groove and to be thicker than the groove width at the bottom part of the insertion groove, and
the bent piece is inserted into the insertion groove by compression of the foam material.

2. The resin molded-product unit according to claim 1, wherein
the resin molded-product is formed with an insertion hole that penetrates from the surface to a rear surface and into which the bent piece is inserted,
the resin molded-product is molded by a first resin molding die and a second resin molding die that are capable of being separated from each other in a first direction,
the insertion hole is molded by an insertion hole molding portion that is respectively provided in the first resin molding die and the second resin molding die and abut on each other during molding of the resin molded-product, and
the insertion groove is molded by an insertion groove molding portion that is movably provided in the first resin molding die configured to mold the surface of the resin molded-product in a second direction inclined with respect to the first direction.

3. The resin molded-product unit according to claim 1, wherein
one end surface of the bent piece abuts on a bottom surface of the insertion groove, and
a side surface of the bent piece abut on a side surface of the insertion groove.

4. The resin molded-product unit according to claim 1, wherein
an uneven portion is formed on the first side surface.

5. A molding method of a resin molded-product unit, the resin molded-product unit comprising:
an attachment member configured by a cover and a foam material, and including a bent piece formed at one end; and
a resin molded-product including an insertion groove which is formed on a surface and into which the bent piece is inserted, the attachment member being attached to the surface,
the molding method comprising:
inserting the bent piece into the insertion groove by compression of the foam material, the insertion groove, as manufactured, being formed such that a first side surface of the insertion groove is inclined relative to a second side surface of the insertion groove opposite to the first side surface, so that a groove width between the first side surface, which abuts on an inner surface of the bent piece, and the second side surface opposite to the first side surface, becomes wider at an entrance part than a bottom part of the insertion groove, the bent piece being formed to be thinner than the groove width at the entrance part of the insertion groove and to be thicker than the groove width at the bottom part of the insertion groove.

6. The molding method of a resin molded-product unit according to claim 5, wherein
the resin molded-product is formed with an insertion hole that penetrates from the surface to a rear surface and into which the bent piece is inserted,
the resin molded-product is molded by a first resin molding die and a second resin molding die that are capable of being separated from each other in a first direction,
the insertion hole is molded by an insertion hole molding portion that is respectively provided in the first resin molding die and the second resin molding die and abut on each other during molding of the resin molded-product, and
the insertion groove is molded by an insertion groove molding portion that is movably provided in the first resin molding die configured to mold the surface of the resin molded-product in a second direction inclined with respect to the first direction.

* * * * *